(12) United States Patent
Akieda et al.

(10) Patent No.: US 6,789,425 B2
(45) Date of Patent: Sep. 14, 2004

(54) ACCELERATION-SENSING SYSTEM

(75) Inventors: Shinichiro Akieda, Shinagawa (JP);
Takuya Uchiyama, Shinagawa (JP);
Michiko Endo, Shinagawa (JP);
Masayuki Kato, Shinagawa (JP)

(73) Assignee: Nagano Fujitsu Component Limited, Nagano (JP)

(*) Notice: Subject to any disclaimer, the term of this patent is extended or adjusted under 35 U.S.C. 154(b) by 0 days.

(21) Appl. No.: 10/193,292

(22) Filed: Jul. 12, 2002

(65) Prior Publication Data

US 2003/0024314 A1 Feb. 6, 2003

(30) Foreign Application Priority Data

Aug. 1, 2001 (JP) ........................................ 2001-233215

(51) Int. Cl.⁷ .............................................. G01P 15/11
(52) U.S. Cl. ..................................... 73/514.31; 73/510
(58) Field of Search ...................... 73/493, 510, 514.31, 73/865.4, 514.01, 514.02

(56) References Cited

U.S. PATENT DOCUMENTS

| | | | | |
|---|---|---|---|---|
| 4,498,341 A | * | 2/1985 | Breitbach et al. | ........ 73/514.31 |
| 4,901,571 A | * | 2/1990 | Reinhardt et al. | ........ 73/514.31 |
| 5,383,363 A | * | 1/1995 | Kulmaczewski | ............. 73/510 |
| 5,524,489 A | * | 6/1996 | Twigg | ..................... 73/514.38 |
| 5,835,077 A | * | 11/1998 | Dao et al. | ................ 73/514.09 |
| 6,115,261 A | * | 9/2000 | Platt et al. | .................... 73/493 |
| 6,131,457 A | * | 10/2000 | Sato | ........................ 73/514.31 |

FOREIGN PATENT DOCUMENTS

| | | |
|---|---|---|
| JP | 5-107260 | 4/1993 |
| JP | 6-148232 | 5/1994 |
| JP | 7-26770 | 5/1995 |
| JP | 2000-308756 | 11/2000 |

* cited by examiner

*Primary Examiner*—John E. Chapman
(74) *Attorney, Agent, or Firm*—Staas & Halsey LLP

(57) ABSTRACT

An acceleration-sensing system for sensing acceleration in a three-dimensional manner is proposed. The acceleration-sensing system includes a first acceleration-sensing unit for sensing acceleration in a two-dimensional manner along first and second directions that are perpendicular to each other and a second acceleration-sensing unit for sensing acceleration in a one-dimensional manner along at least another direction that is perpendicular to the first and second directions.

9 Claims, 16 Drawing Sheets

MOVE BODY
(TO THE SOUND)

DANCE

BASEBALL

UPPER

STRAIGHT

BOXING

FIG.14A
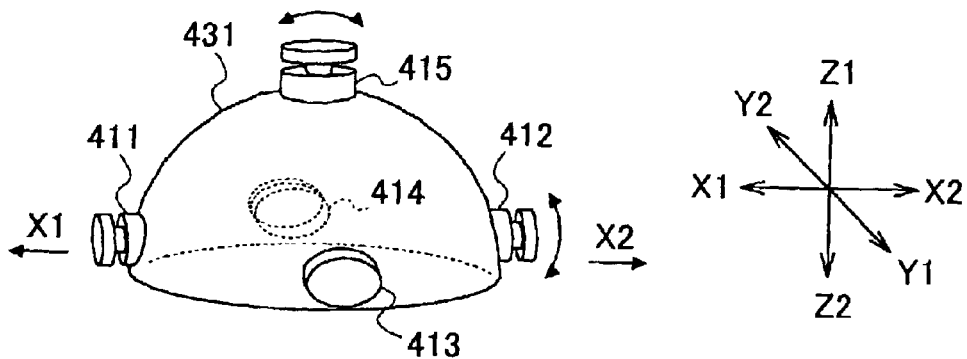
FIG.14B  FIG.14C
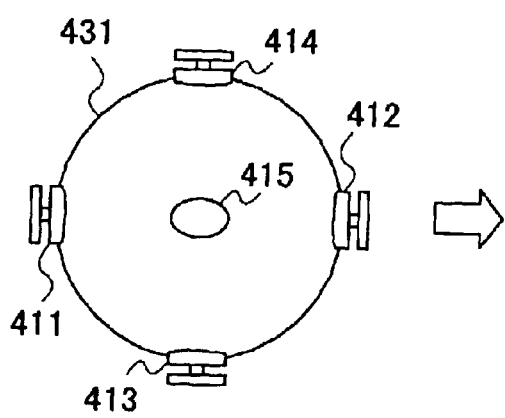
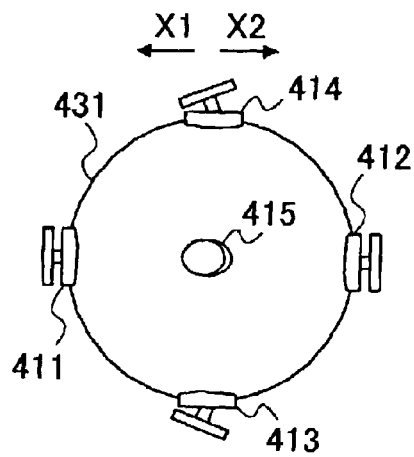
FIG.14D
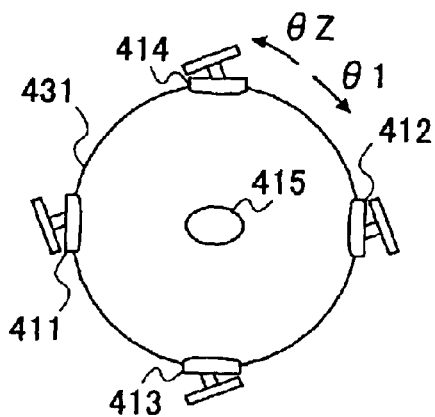

ACCELERATION-SENSING SYSTEM

BACKGROUND OF THE INVENTION

1. Field of the Invention

The present invention relates to an acceleration-sensing system and particularly relates to an acceleration-sensing system for sensing acceleration in a three-dimensional manner.

2. Description of the Related Art

Recently, various input techniques are required in technical fields such as the field of computer games. There is a particularly strong demand for techniques of inputting information related to human movements by sensing acceleration acting on an input device.

FIGS. 1A through 1D are diagrams used for explaining input techniques that are required in the field of computer games.

As shown in FIG. 1A, three-dimensional (3D) acceleration sensors 1 are attached to wrists and ankles of a game player. A game machine can detect the player's movements by detecting movements of the wrists and ankles of the player from signals produced by the 3D acceleration sensors 1.

Accordingly, for computer game applications, for example, movements of a dancing player can be detected as shown in FIG. 1B, movements made by the player in a baseball game can be detected as shown in FIG. 1C and movements made by the player in a boxing game can be detected as shown in FIG. 1D.

In the related art, one-dimensional (1D) acceleration sensors for sensing acceleration in a one-dimensional manner and two-dimensional (2D) acceleration sensors for sensing acceleration in a two-dimensional manner are known. However, such 1D and 2D acceleration sensors are not suitable for detecting movements of the wrists and ankles that move in a three-dimensional space.

Known three-dimensional acceleration sensors mainly use piezoelectric elements and are not suitable for sensing accelerations of a relatively low frequency such as movements of a human body.

SUMMARY OF THE INVENTION

Accordingly, it is a general object of the present invention to provide an acceleration-sensing system that can obviate the problems described above.

It is another and more specific object of the present invention to provide a three-dimensional acceleration-sensing system that can detect acceleration of a low frequency such as movements of a human body.

According to the present invention, an acceleration-sensing system for sensing acceleration in a three-dimensional manner is provided which includes a first acceleration-sensing unit for sensing acceleration in a two-dimensional manner along first and second directions that are perpendicular to each other and a second acceleration-sensing unit for sensing acceleration in a one-dimensional manner along at least another direction that is perpendicular to the first and second directions.

With the invention described above, a mechanism for moving a magnet in the three-dimensional directions can be dispensed with. Therefore, the present invention is advantageous in that detection acceleration in the three dimensional directions can be achieved at a low cost. Further, the present invention is advantageous in that acceleration of a low frequency can be detected.

According to the present invention, the first and second acceleration-sensing units are mounted on the same circuit board. Therefore, the acceleration-sensing system can be provided with a reduced size.

According to the present invention, the electromagnetic conversion elements are mounted on the circuit board. Therefore, the circuit can be provided with a simple wiring pattern at a low cost.

According to the present invention, the structure of the first and the second acceleration-sensing units may be the same. Therefore, a reduced number of components are required for the acceleration-sensing system of the present invention and thus the acceleration-sensing system of the present invention can be constructed at a low cost.

According to the present invention, acceleration in the three-dimensional directions is detected by combining a plurality of acceleration-sensing units. Therefore, there is no need to provide a mechanism for moving a magnet in the three-dimensional directions. Therefore, the present invention is advantageous in that detecting acceleration in the three dimensional directions can be achieved at a low cost. Further, the present invention is advantageous in that low frequency acceleration can be detected.

According to the present invention, a plurality of acceleration-sensing units are attached to a single supporting member, which may be a hemispherical body. With such an acceleration-sensing system, a twisting movement can be detected.

BRIEF DESCRIPTION OF THE DRAWINGS

FIGS. 14A through 14D are diagrams showing the three-dimensional acceleration-sensing system of the fourth embodiment of the present invention.

DETAILED DESCRIPTION OF THE PREFERRED EMBODIMENTS

In the following, principles and embodiments of the present invention will be described with reference to the accompanying drawings.

Figure 1A:
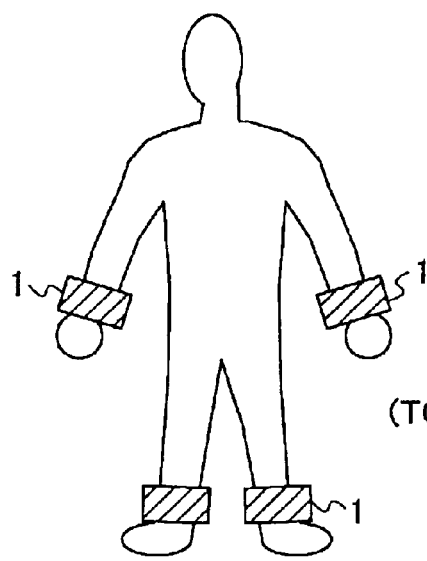
FIGS. 1A through 1D are diagrams used for explaining input techniques required in the field of computer games.
Figure 1B:
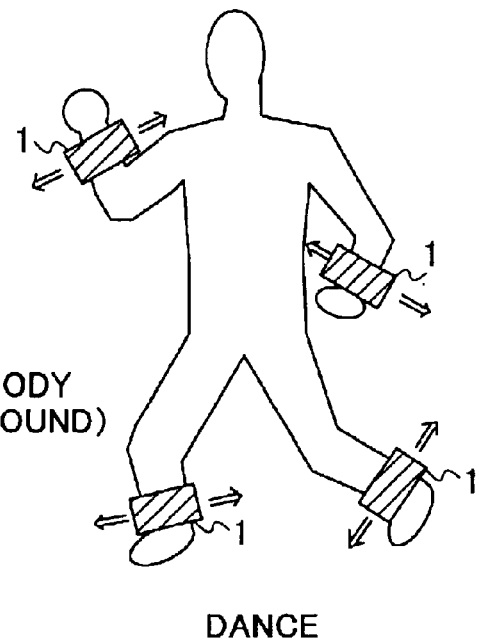
Figure 1C:
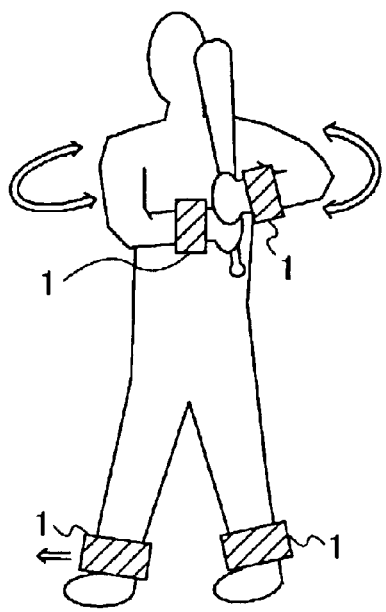
Figure 1D:
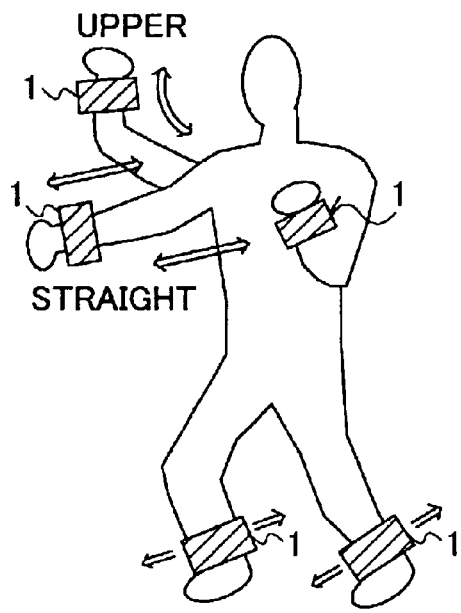
Figure 2:
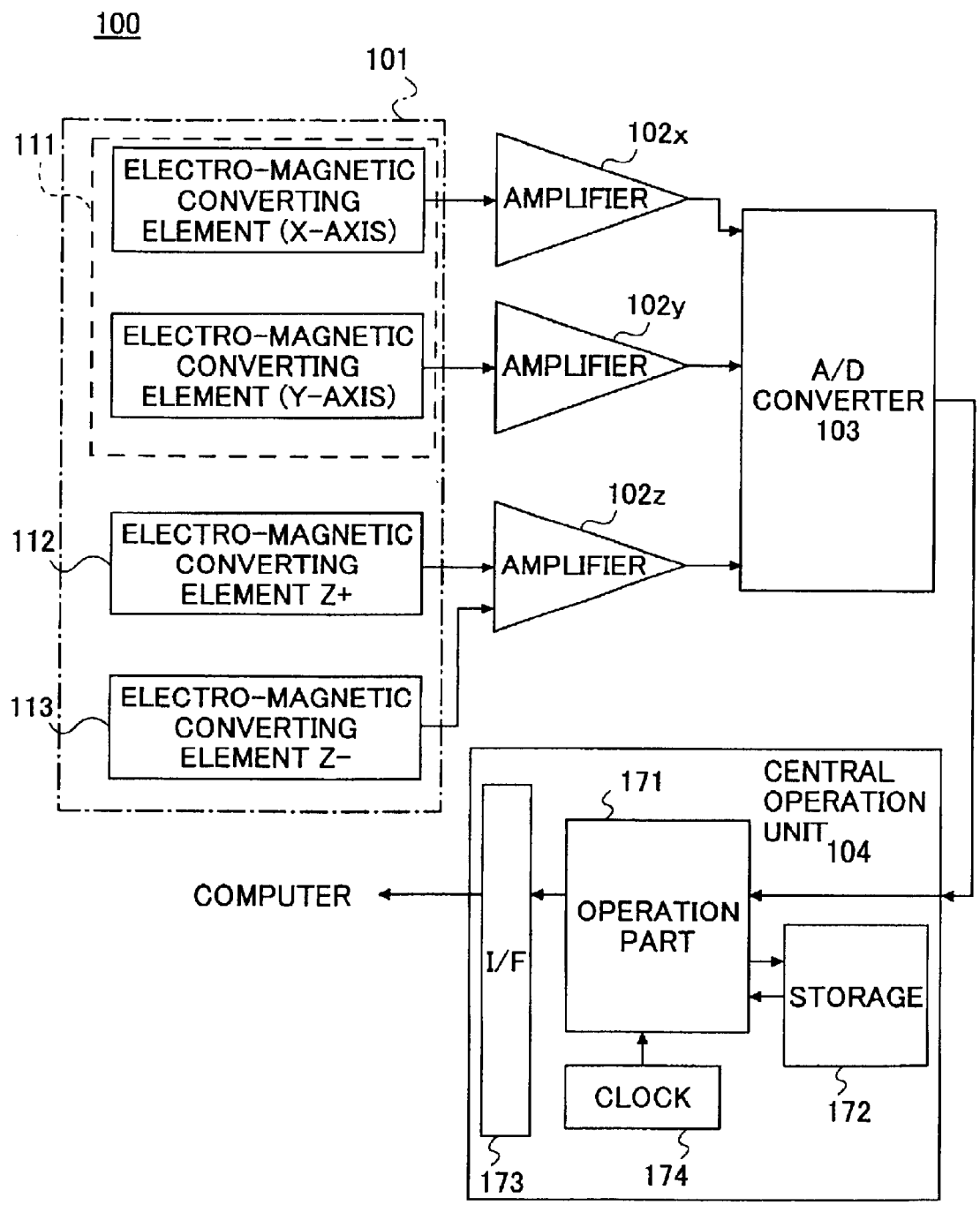
FIG. 2 is a block diagram showing a configuration of a three-dimensional acceleration-sensing system of a first embodiment of the present invention.
Figure 3:
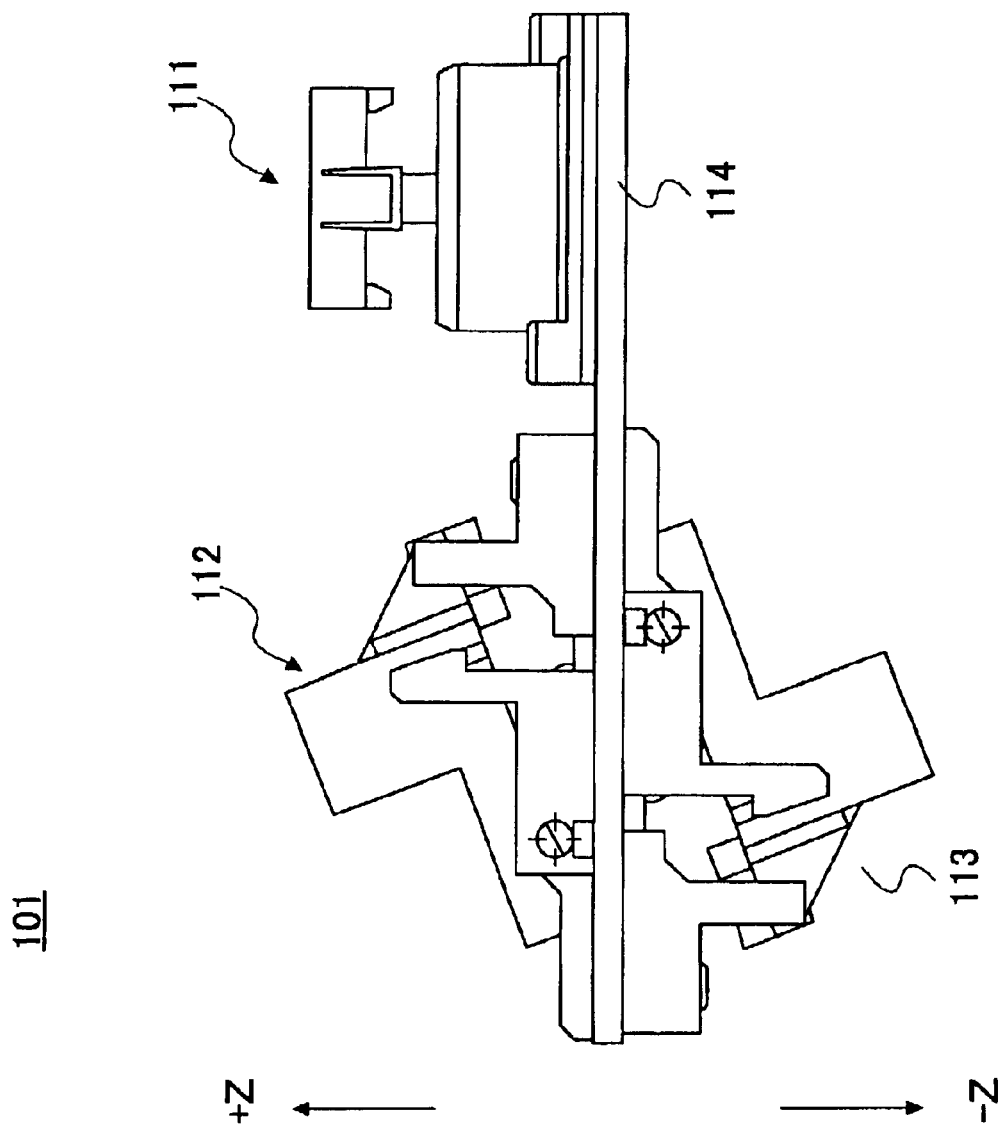
FIG. 3 is a side-view of an acceleration-sensing part of the three-dimensional acceleration-sensing system of the first embodiment of the present invention.
Figure 4A:
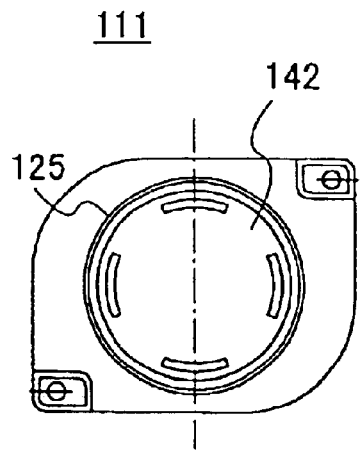
FIGS. 4A through 4D are diagrams showing a first acceleration-sensing unit of the three-dimensional acceleration-sensing system of the first embodiment of the present invention.
Figure 4C:
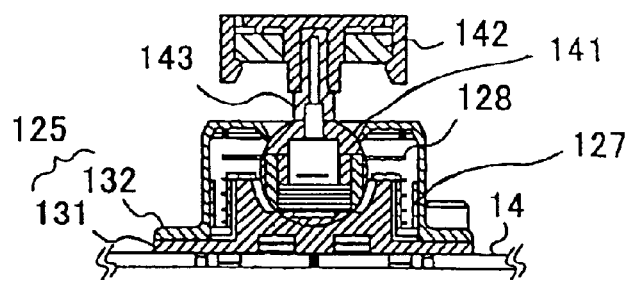
Figure 4B:
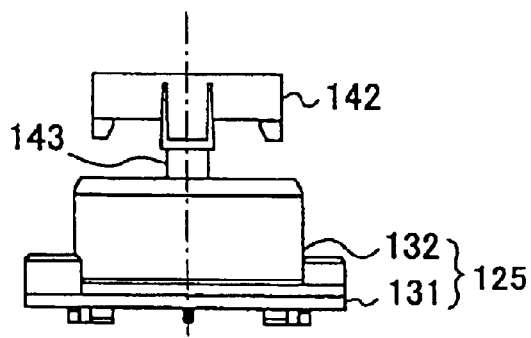
Figure 4D:
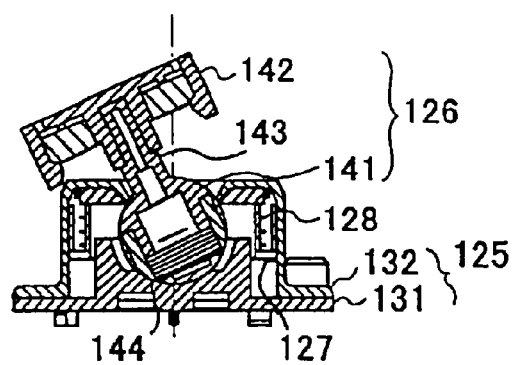

FIG. 2 is a block diagram showing an acceleration-sensing system of the first embodiment of the present invention and FIG. 3 is a diagram showing an acceleration-sensing part of the acceleration-sensing system of the first embodiment of the present invention.

An acceleration-sensing system 100 of the present embodiment includes an acceleration-sensing part 101, amplifiers 102x, 102y and 102z, an analog/digital (A/D) converter 103 and an operating unit 104.

The acceleration-sensing part 101 includes a circuit board 114 and acceleration-sensing units 111, 112 and 113 mounted thereon. The acceleration-sensing unit 111 senses acceleration in a two-dimensional (2D) manner along an X-axis and a Y-axis. The Y-axis is perpendicular to the X-axis. The acceleration-sensing unit 112 senses acceleration in a one-dimensional (1D) manner in the +Z direction. The acceleration-sensing unit 113 senses acceleration in a one-dimensional (1D) manner in the -Z direction. The +Z and -Z directions are mutually opposite and are perpendicular to the Z and Y directions.

Figure 5:
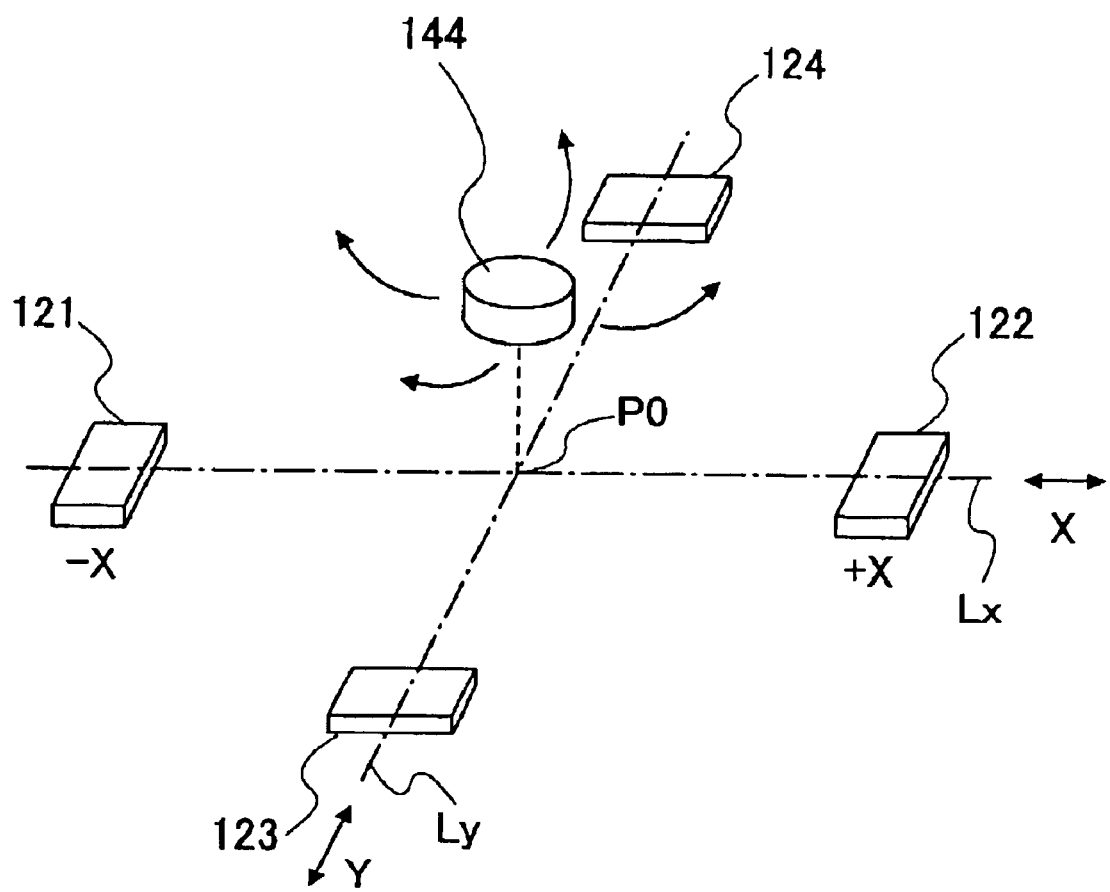
FIG. 5 is a perspective diagram showing the main part of the first acceleration-sensing unit of the first embodiment of the present invention.
Figure 6A:
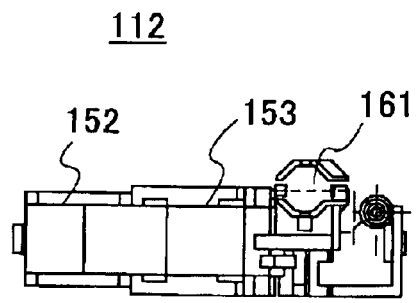
FIGS. 6A through 6E are diagrams showing a second acceleration-sensing unit of the three-dimensional acceleration-sensing system of the first embodiment of the present invention.
Figure 6B:
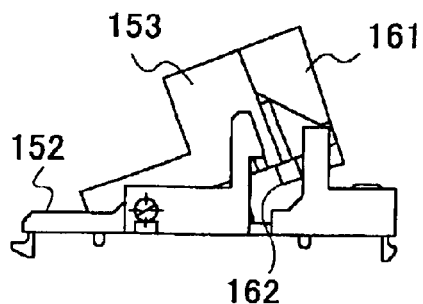
Figure 6C:
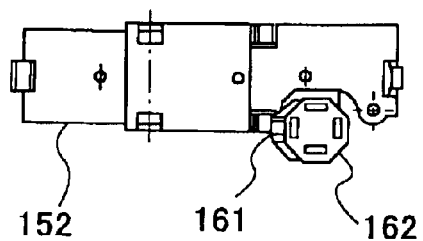
Figure 6D:
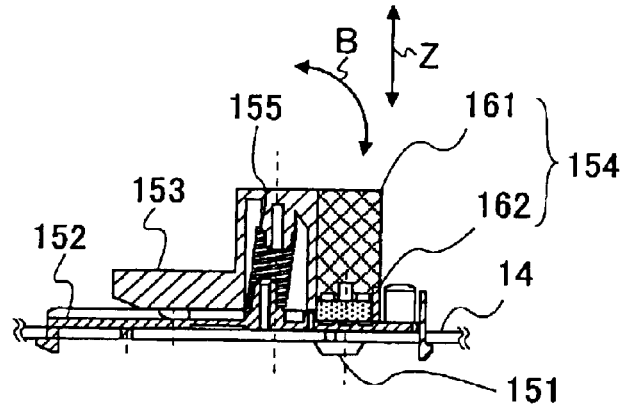
Figure 6E:
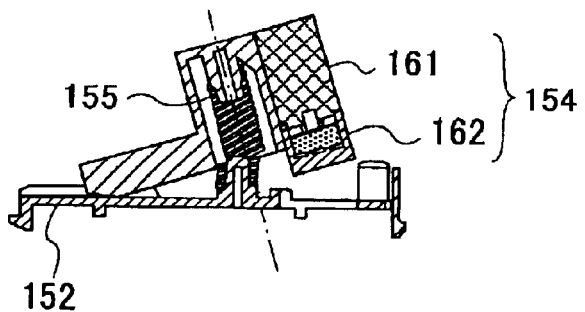

First, the acceleration-sensing unit 111 will be described in detail. FIGS. 4A through 4D are diagrams showing an acceleration-sensing unit 111 of the acceleration-sensing system of the first embodiment of the present invention. FIG. 5 is a perspective diagram showing the main part of the acceleration-sensing unit 111 of the acceleration-sensing system of the first embodiment of the present invention.

The acceleration-sensing unit 111 includes Hall elements 121 through 124, a housing 125, a pivotable part 126, a pressing member 127 and a spring 128.

The Hall elements 121 and 122 are provided on the circuit board 14 along the direction shown by an arrow X. The Hall elements 123 and 124 are provided on the circuit board 14 along the direction shown by an arrow Y. An extension line Lx connecting the Hall elements 121 and 122 and an extension line Ly connecting the Hall elements 123 and 124 cross at a predetermined position P0. Since the Hall elements 121 through 124 are mounted on the circuit board 14, interconnections between the Hall elements 121 through 124 may be provided by means of printed wires formed on the circuit board 14. Thus, the interconnections between the Hall elements 121 through 124 can be simplified.

The housing 125 includes a base 131 and a cover 132. The base 131 is provided on the Hall elements 121 through 124 and pivotably supports the lower end of the pivotable part 126. The pivotable part 126 includes a spherical part 141 and a weight part 142 that are connected via a lever 143. A permanent magnet 144 is mounted inside the spherical part 141.

The spherical part 141 is pivotably supported on the base 131 and a pressing member 127 is placed on top. The spring 128 is provided between the pressing member 127 and the cover 132, so as to press the pressing member 127 downward. The spherical part 141 is pressed by the pressing member 127 and is retained inside the housing 125 in such a manner that the lever 143 is substantially perpendicular to the circuit board 14.

The weight part 142 is provided at the top end of the lever 143 and has a certain mass. When acceleration is applied on the weight part 142, a force corresponding to the acceleration is exerted in a direction along the direction of acceleration.

Due to the force exerted on the weight part 142, the lever 143 pivots in the direction of acceleration. As a result of the pivotal movement of the lever 143, the spherical part 141 rotates. Due to the rotational movement of the spherical part 141, a direction of magnetic flux of the permanent magnet 144 changes. Due to the change of the direction of the magnetic flux of the permanent magnet 144, the amount of magnetic flux supplied to the Hall elements 121 through 124 changes. The Hall elements 121 through 124 output electric currents corresponding to the amount of magnetic flux supplied by the permanent magnet 144.

Now, the acceleration-sensing unit 112 will be described in detail.

Figure 7:
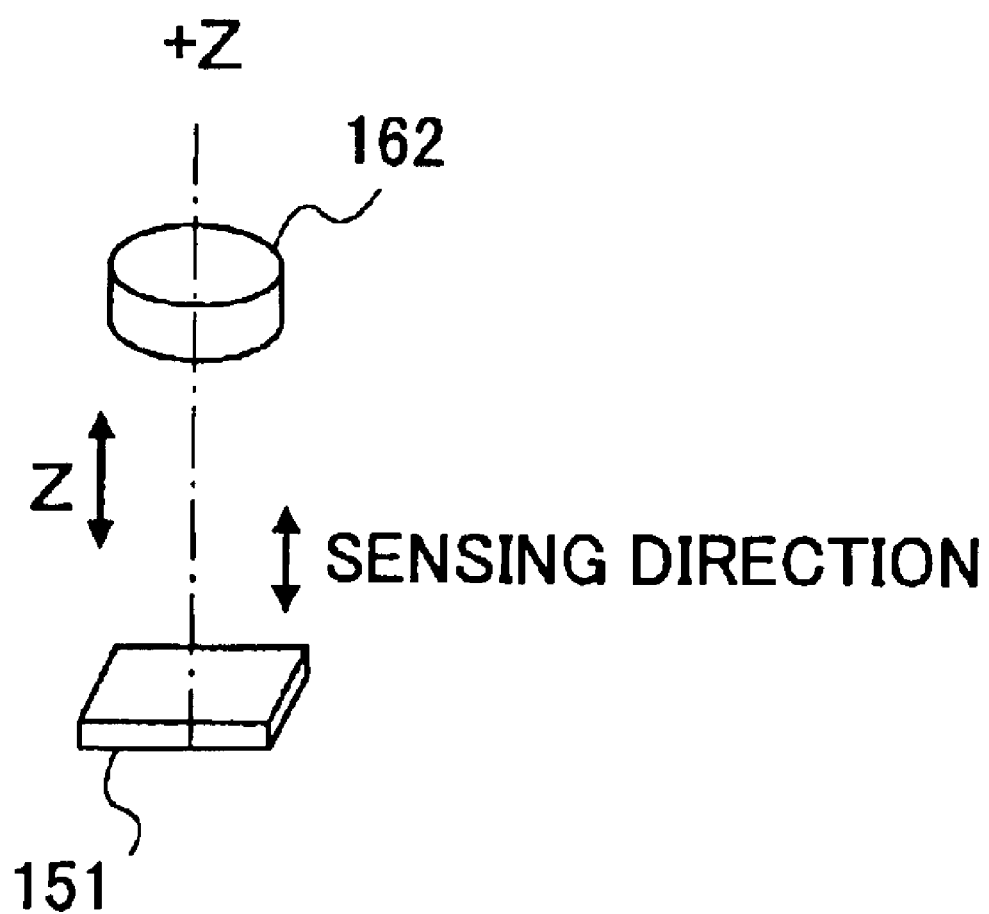
FIG. 7 is a perspective diagram showing the main part of the second acceleration-sensing device shown in FIGS. 6A through 6E.

FIGS. 6A through 6E are diagrams showing an acceleration-sensing unit 112 of the first embodiment of the present invention and FIG. 7 is a perspective diagram showing the main part of the acceleration-sensing unit 112.

The acceleration-sensing unit 112 includes a Hall element 151, a base part 152, a pivotable part 153, a weight part 154 and a spring 155.

The Hall element 151 is mounted on the circuit board 14 at a predetermined position. The base part 152 supports the pivotable part 153 such that the pivotable part 153 is pivotable in directions shown by an arrow B.

The spring 155 is provided between the base part 152 and the pivotable part 153. Further, the weight part 154 is attached at the tip of the pivotable part 153. The weight part 154 includes a weight 161 and a permanent magnet 162.

The weight 161 has a certain mass. The permanent magnet 162 is attached at the bottom end of the weight 161, so as to oppose the Hall element 151. A distance between the permanent magnet 162 and the Hall element 151 increases or decreases in accordance with a pivotal movement of the pivotable part 153 in the directions shown by the arrow B.

When the weight 161 experiences acceleration in a direction shown by an arrow Z, a force corresponding to the acceleration is exerted on the weight 161. As a result of the force acting on the weight 161, the pivotable part pivots in the direction shown by the arrow B, which is a direction against a biasing force exerted by the spring 161.

As a result of the pivotable part 153 being pivoted in the direction shown by the arrow B, the distance between the permanent magnet 162 and the Hall element changes. The Hall element 151 produces an electric current in accordance with the distance from the permanent magnet 162.

It is to be noted that the acceleration-sensing unit 113 has a structure similar to that of the acceleration-sensing unit 112 shown in FIGS. 6 and 7 and therefore will not be described in detail.

It is to be noted that the acceleration-sensing unit 113 is mounted on the opposite (back) side of the circuit board 14.

Outputs of the Hall elements 121 and 122 of the acceleration-sensing unit 111 are supplied to the amplifier 102x. The amplifier 102x takes a difference between the output of the Hall element 121 and the output of the Hall element 122 and supplies the difference to the A/D converter 103 as an output of the X-axis, Lx direction.

Figure 8:
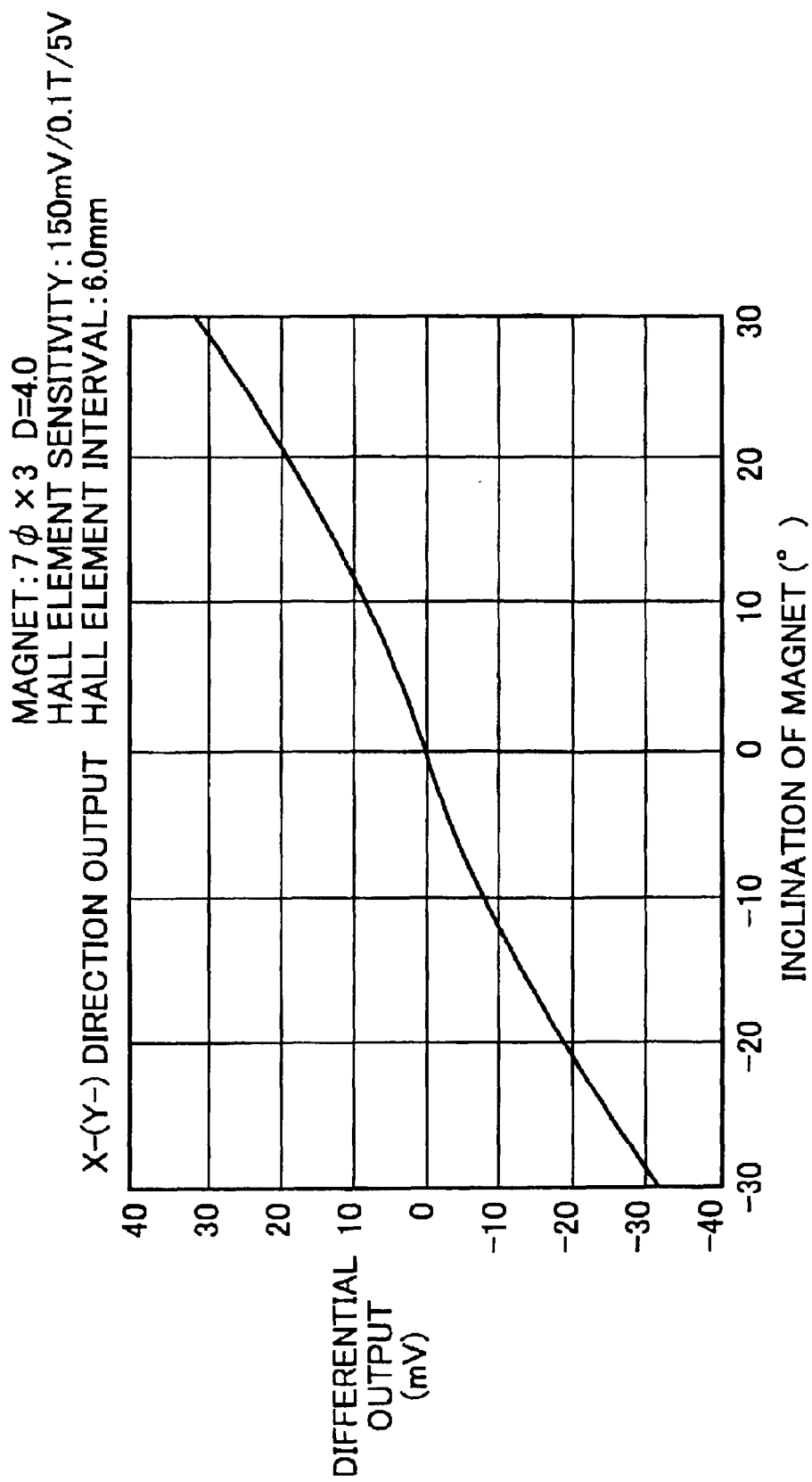
FIG. 8 is a graph of an output characteristic curve of one of the amplifiers coupled to the first acceleration-sensing unit in the three-dimensional acceleration system shown in FIG. 2.

FIG. 8 is a graph of an output characteristic curve of the amplifier 102x. In the graph of FIG. 8, the abscissa (horizontal axis) represents an inclination of the permanent magnet 144 and the ordinate (vertical axis) represents an output of the amplifier 102x.

Referring to FIG. 8, it can be seen that the output of the amplifier 102x has a characteristic that indicates zero when the permanent magnet 144 is at a neutral position and changes substantially linearly in accordance with the inclination of the permanent magnet 144. It is to be noted that an output of the amplifier 102y has a characteristic curve similar to the curve shown in FIG. 8.

Outputs of the Hall elements 123 and 124 of the acceleration-sensing unit 111 are supplied to an amplifier 102y. The amplifier 102y takes a difference between the outputs of the Hall elements 123 and 124 and supplies the difference to the A/D converter 103 as an output for the y-axis, Ly direction.

An output of the Hall element 151 of the acceleration-sensing unit 112 and an output of the Hall element 151 of the acceleration-sensing unit 113 are supplied to the amplifier 102z. The amplifier 102z takes a difference between the output of the Hall element 151 of the acceleration-sensing unit 112 and the output of the Hall element 151 of the acceleration-sensing unit 113 and supplies the difference to the A/D converter 103 as an output in the Z-axis, Lz direction.

Figure 9:
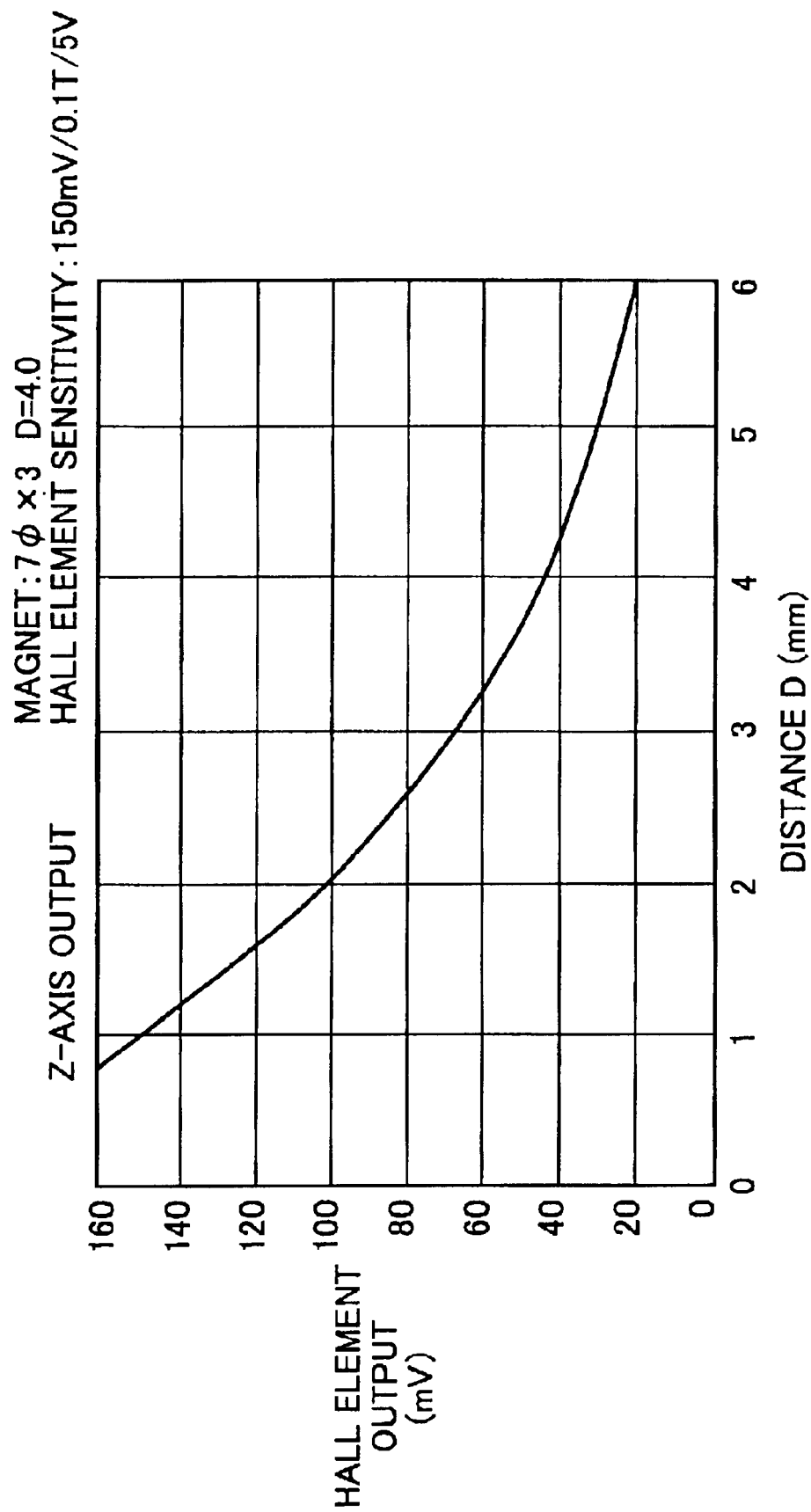
FIG. 9 is a graph of an output characteristic curve of the acceleration-sensing device of the present invention.

FIG. 9 is a graph of an output characteristic curve of the acceleration-sensing unit 112 of the present invention. In FIG. 9, the abscissa (horizontal axis) represents a distance between the permanent magnet 162 and the circuit board 14 and the ordinate (vertical axis) represents an output of the Hall element 151. As shown in FIG. 9, the output of the Hall element 151 shows a characteristic that it decreases as the distance between the permanent magnet 162 and the circuit board 14 increases.

The A/D converter 103 converts outputs from the amplifiers 102x, 102y and 102z to respective digital data. The digital data converted at the A/D converter 103 are supplied to the central operation unit 104.

The central operation unit 104 includes an operation part 171, a storage part 172, an interface part 173 and a clock part 174. The operation part 171 temporarily stores digital data from the A/D converter 103 in the storage part 172, formats the digital data into a format to be used for transmitting the data to the computer and then supplies the formatted digital data to the interface part 173. The operation part 171 retrieves data, executes operations and controls outputs based on clock signals supplied by the clock part 174. The interface part 173 is interfaced to the computer and transmits data from the operation part 171 to the computer.

Thus, according to the present embodiment, a three-dimensional acceleration detection can be achieved using the existing mechanism without providing a further mechanism for moving the permanent magnet in a three-dimensional manner. Therefore, the present invention provides an acceleration-sensing system having a simple structure and that can be manufactured at a low cost.

Further, the present embodiment provides a compact structure of the acceleration-sensing system as a whole since the acceleration-sensing units 111, 112 and 113 are mounted on the same circuit board 114.

It is to be noted that the present embodiment has been described with one-dimensional acceleration-sensing units as shown in FIGS. 6 and 7 for detections in the Z-direction, but other one-dimensional acceleration-sensing unit can also be used.

Figure 10:
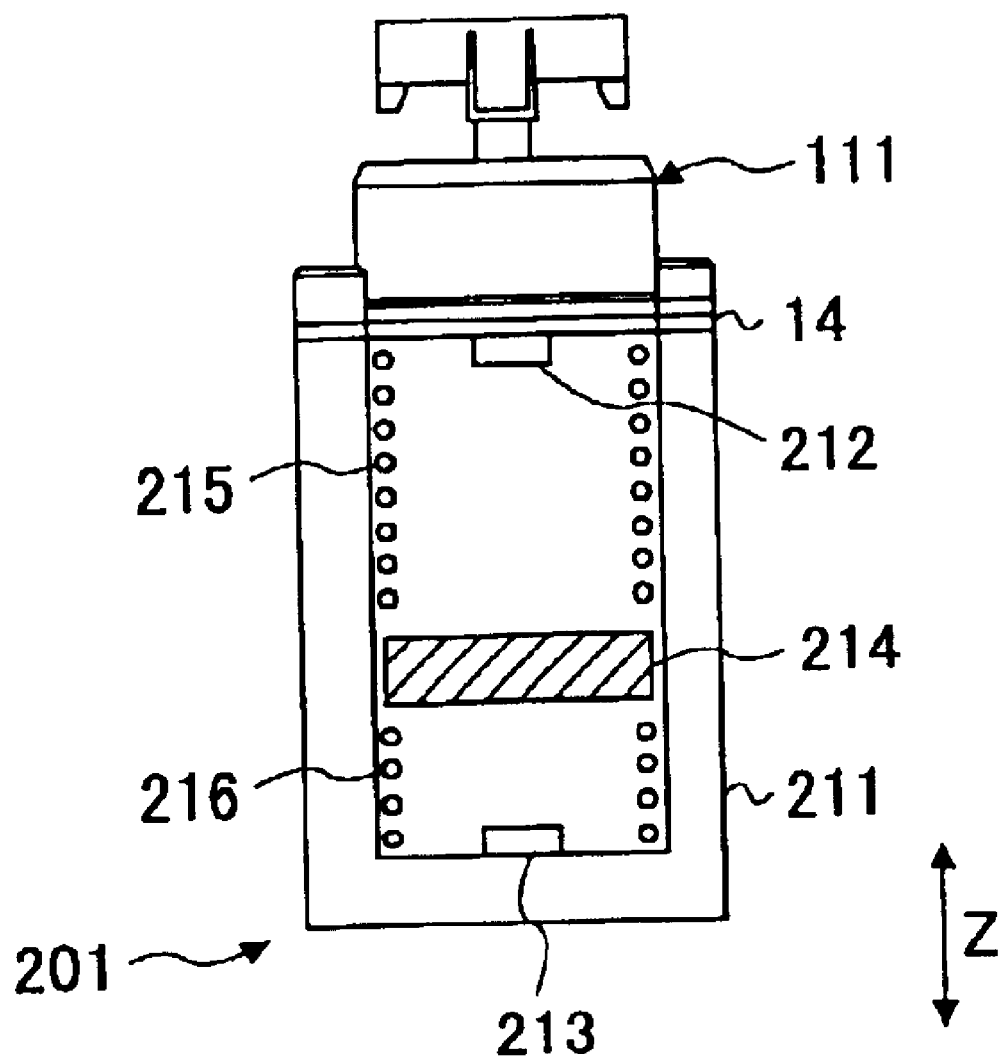
FIG. 10 is a schematic diagram showing a configuration of a three-dimensional acceleration-sensing system of the second embodiment of the present invention.

FIG. 10 is a schematic diagram showing a configuration of a three-dimensional acceleration-sensing system of the second embodiment of the present invention. In the figure, elements similar to those shown in FIG. 3 are labeled with similar numerals used in FIG. 3 and will not be described in detail.

An acceleration-sensing system 200 of the present embodiment is provided with an acceleration-sensing unit 201 instead of the acceleration-sensing units 112 and 113 of FIG. 3.

The acceleration-sensing unit 201 includes a housing 211, Hall elements 212, 213, a permanent magnet 214 and springs 215, 216. The housing 211 has a cylindrical shape with one of the ends being open and the other one of the ends being closed. The open end of the housing 211 is attached to the circuit board 14. The hall element 212 is provided at a housing-mounting part of the circuit board 14. The Hall element 213 is provided at the opposite end (bottom) of the housing 211.

The permanent magnet 214 is accommodated inside the housing 211 at a position between the springs 215 and 216 such that the permanent magnet 214 is movable in directions shown by an arrow Z.

When the permanent magnet 214 experiences an acceleration in the Z-direction, a force corresponding to the acceleration is exerted on the permanent magnet 214. When the force is exerted on the permanent magnet 214, the permanent magnet 214 moves in directions shown by an arrow Z against a biasing force exerted by one of the springs 215 and 216. As a result of movement of the permanent magnet 214, distances between the permanent magnet 214 and the Hall elements 212 and 213 vary. The Hall elements 212 and 213 supply outputs to the amplifier 102z that correspond to the respective distances to the permanent magnet 214. The amplifier 102z takes the difference between the outputs of the Hall elements 212 and 213 and supplies the difference to the A/D converter 103 as acceleration in the Z-axis.

As has been described above, according to the present invention, acceleration in the Z-direction can be detected.

In the above-mentioned first and second embodiments of the present invention, one-dimensional acceleration-sensing units shown in FIGS. 6 and 7 are used for sensing acceleration in the Z-direction. However, the two-dimensional acceleration-sensing unit shown in FIG. 3 may also be used for sensing acceleration in the Z-direction.

Figure 11:
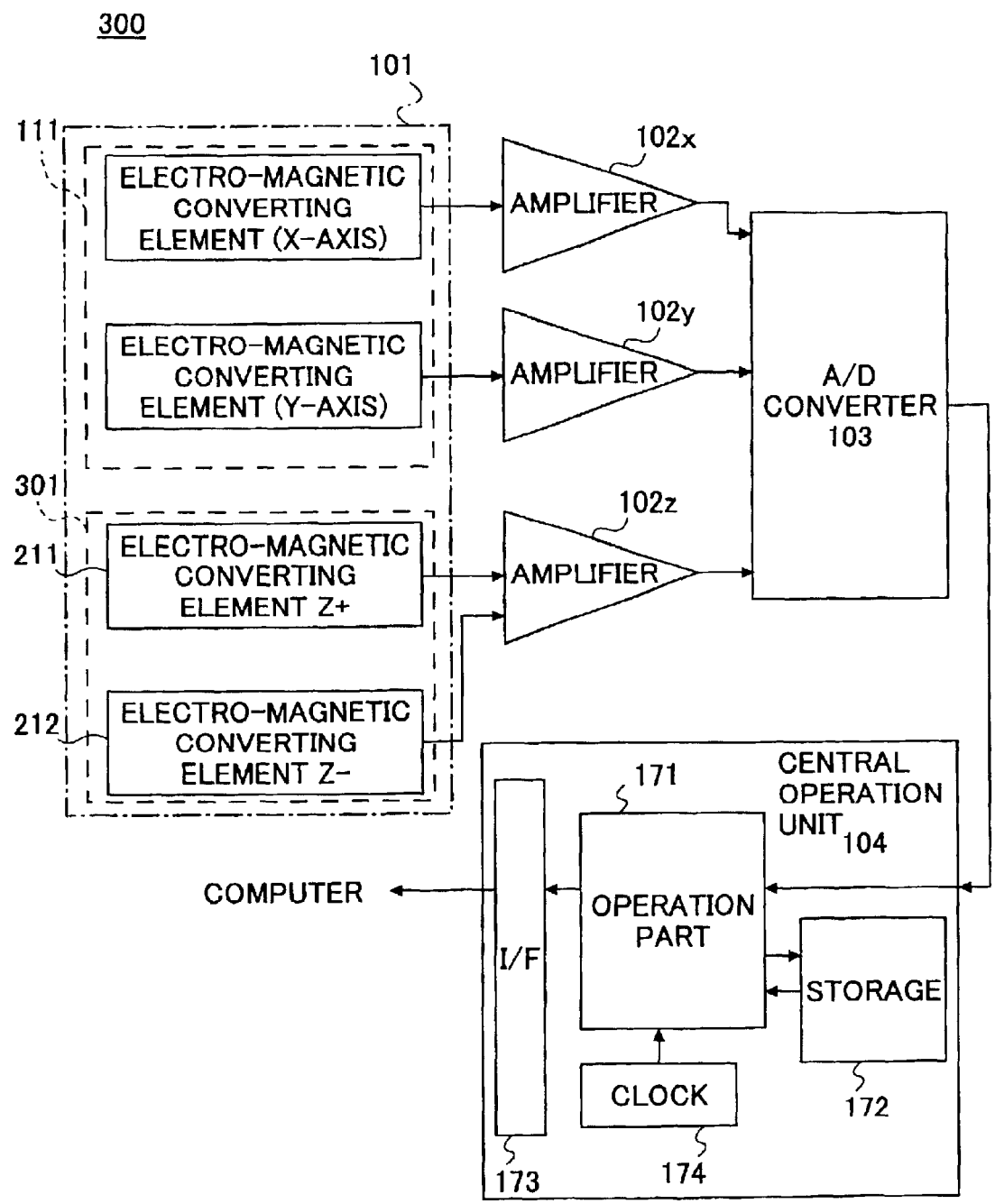
FIG. 11 is a block diagram showing a configuration of a three-dimensional acceleration-sensing system of the third embodiment of the present invention.
Figure 12:
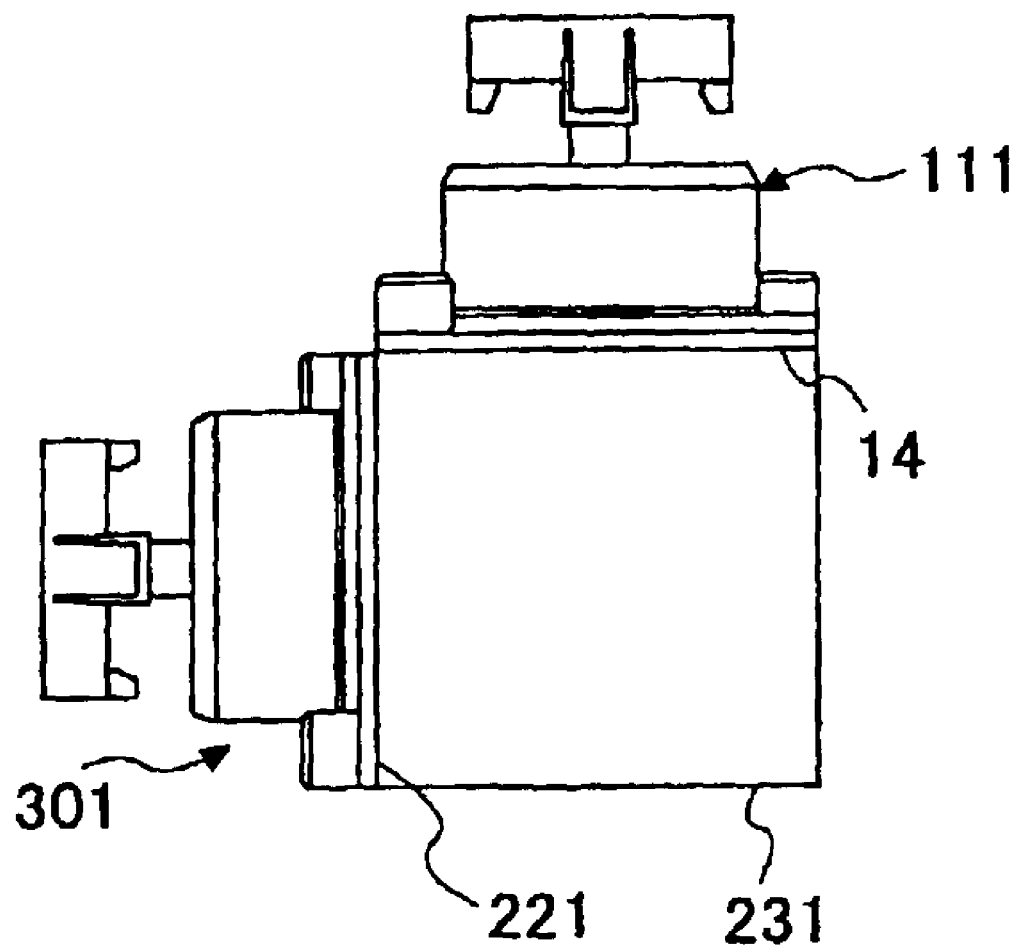
FIG. 12 is a side-view of a three-dimensional acceleration-sensing system of the third embodiment of the present invention.

FIG. 11 is a block diagram showing a configuration of a three-dimensional acceleration-sensing system of the third embodiment of the present invention. FIG. 12 is a side-view of the three-dimensional acceleration-sensing system of the third embodiment of the present invention. In the figures, elements similar to those shown in FIGS. 1 and 2 are indicated using the same reference numerals as those used in FIGS. 1 and 2 and will not be described in detail.

An acceleration-sensing system 300 of the present invention is similar to the acceleration-sensing system 100 shown in FIGS. 1 and 2 except that, instead of the acceleration-sensing unit 112 and 113 for sensing acceleration in the Z-direction, an acceleration-sensing unit 301 is provided that has the same structure as the acceleration-sensing unit 111 used for sensing accelerations in the X- and Y-directions.

The acceleration-sensing unit 301 of the present embodiment is mounted on the circuit board 221 that is provided perpendicular to the circuit board 14. The circuit boards 14 and 221 are secured on a holding member 231 so as to be perpendicular to each other.

The acceleration-sensing unit 301 is mounted on the circuit board 221 such that one of the detectable directions that are perpendicular to each other is the Z-direction. An output of a pair of Hall elements for sensing acceleration in one of the directions of the acceleration-sensing unit 301 is supplied to the amplifier 102z. The amplifier 102z outputs a differential output of the pair of Hall elements as a detection signal in the Z-direction.

In the above-mentioned third embodiment, acceleration in three dimensions, X-, Y- and Z-directions, is detected using two two-dimensional acceleration-sensing units 111 and 301, but it is also possible to detect acceleration in the rotational direction using a plurality of two-dimensional acceleration-sensing units.

Figure 13:
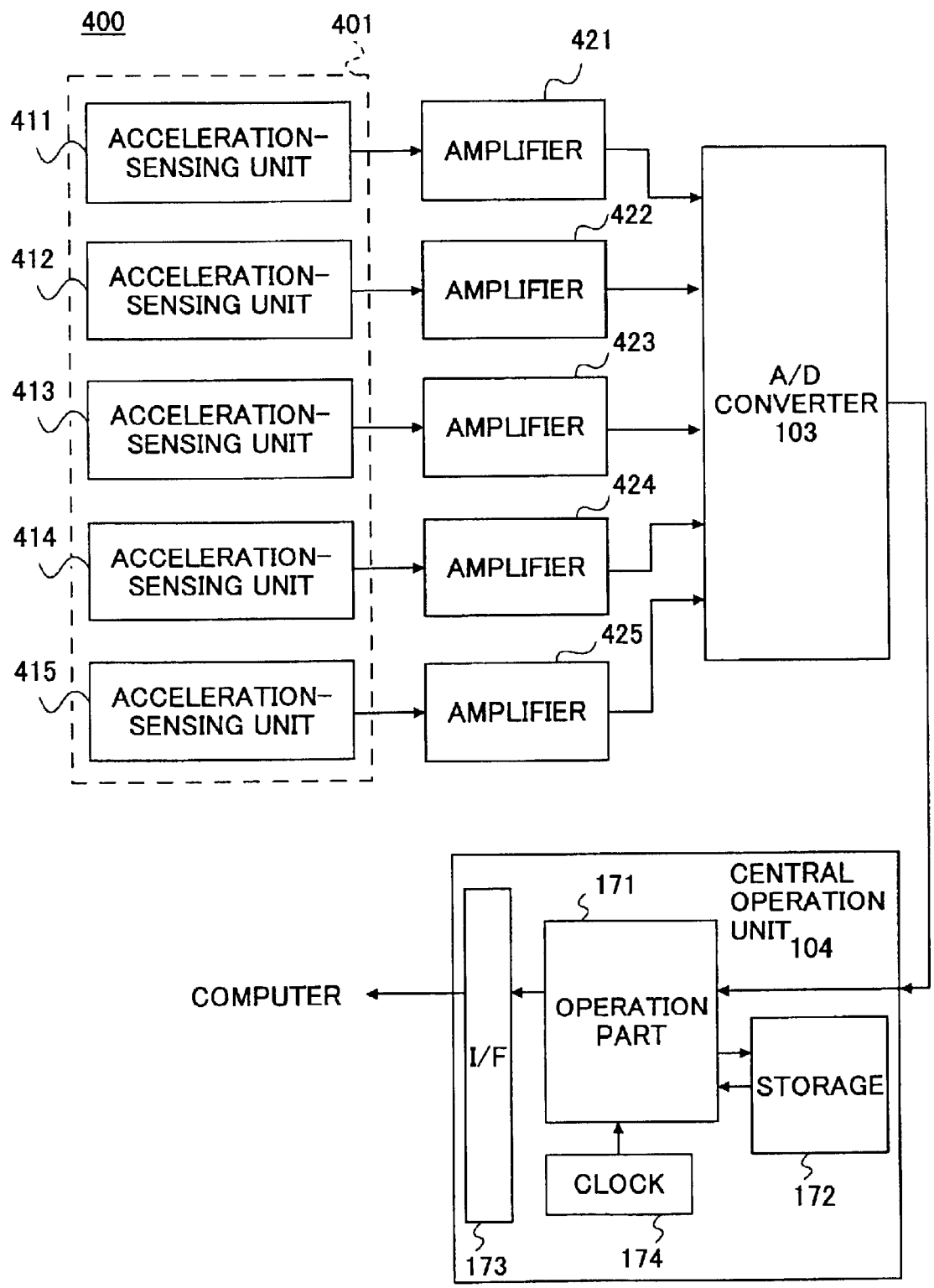
FIG. 13 is a block diagram showing a configuration of a three-dimensional acceleration-sensing system of the fourth embodiment of the present invention.

FIG. 13 is a block diagram showing a configuration of a three-dimensional acceleration-sensing system of the fourth embodiment of the present invention. FIGS. 14A through 14D are diagrams showing the three-dimensional acceleration-sensing system of the fourth embodiment of the present invention. In the figures, elements similar to those shown in FIGS. 2 and 3 are indicated with the same reference numerals and will not be described in detail.

An acceleration-sensing system 400 of the fourth embodiment is similar to the acceleration-sensing system of the first embodiment except for the structure of the acceleration-sensing part 401 and the operation process performed at the central operation unit 104.

The acceleration-sensing system 400 of the present embodiment includes five two-dimensional acceleration-sensing units 411 through 415 that are provided on a hemispherical body 431. The two-dimensional acceleration-sensing units 411 through 415 have the same structure as that of the acceleration-sensing unit 111 shown in FIGS. 4 and 5.

The acceleration-sensing unit 411 is provided on the hemisphere 431 at a position along the direction shown by an arrow X1. The acceleration-sensing unit 411 includes two pairs of Hall elements, one pair being provided along the direction shown by an arrow Y and the other pair being provided along the direction shown by an arrow Z. Detection signals from the acceleration-sensing unit 411 that are detected by the two pairs of Hall elements are supplied to the A/D converter 103 via an amplifier 421. The amplifier 421 generates a differential output of signals from the pair of Hall elements provided along the directions shown by an arrow Y and a differential output of signals from the pair of Hall elements provided along the direction shown by an arrow Z.

The acceleration-sensing unit 412 is provided on the hemispherical body 431 at a position along the direction shown by an arrow X2 and detects accelerations in the directions shown by arrows Y and Z.

The acceleration-sensing unit 413 is provided on the hemispherical body 431 at a position along the direction shown by an arrow Y1 and detects accelerations in the directions shown by arrows X and Z. The acceleration-sensing unit 414 is provided on the hemispherical body 431 at a position along the direction shown by an arrow Y2 and detects accelerations in the directions shown by arrows X and Z. The acceleration-sensing unit 415 is provided on the hemispherical body 431 at a position along the direction shown by an arrow Z1 and detects accelerations in the directions shown by arrows X and Y. The acceleration-sensing units 411 and 412 are provided at positions opposing each other and the acceleration-sensing units 413 and 414 are provided at positions opposing each other. Directions of acceleration are detected based on the detection directions of the acceleration-sensing units 411 through 415.

FIG. 14B shows an acceleration-sensing unit in a state where there is no acceleration. When acceleration in the direction shown by an arrow X2 is applied to the acceleration-sensing unit in a state shown in FIG. 14B, a weight part 142 of the acceleration-sensing units 413, 414 and 415 will pivot in the direction shown by an arrow X1 as shown in FIG. 14C.

When acceleration is applied in the direction shown by an arrow θ1 as shown in FIG. 14D, the weight part 142 of the acceleration-sensing units 411 through 414 will pivot in the direction shown by an arrow θ2. Thus, a twist can be detected from the directions of detection of the acceleration-sensing units 411 through 414.

Figure 15:
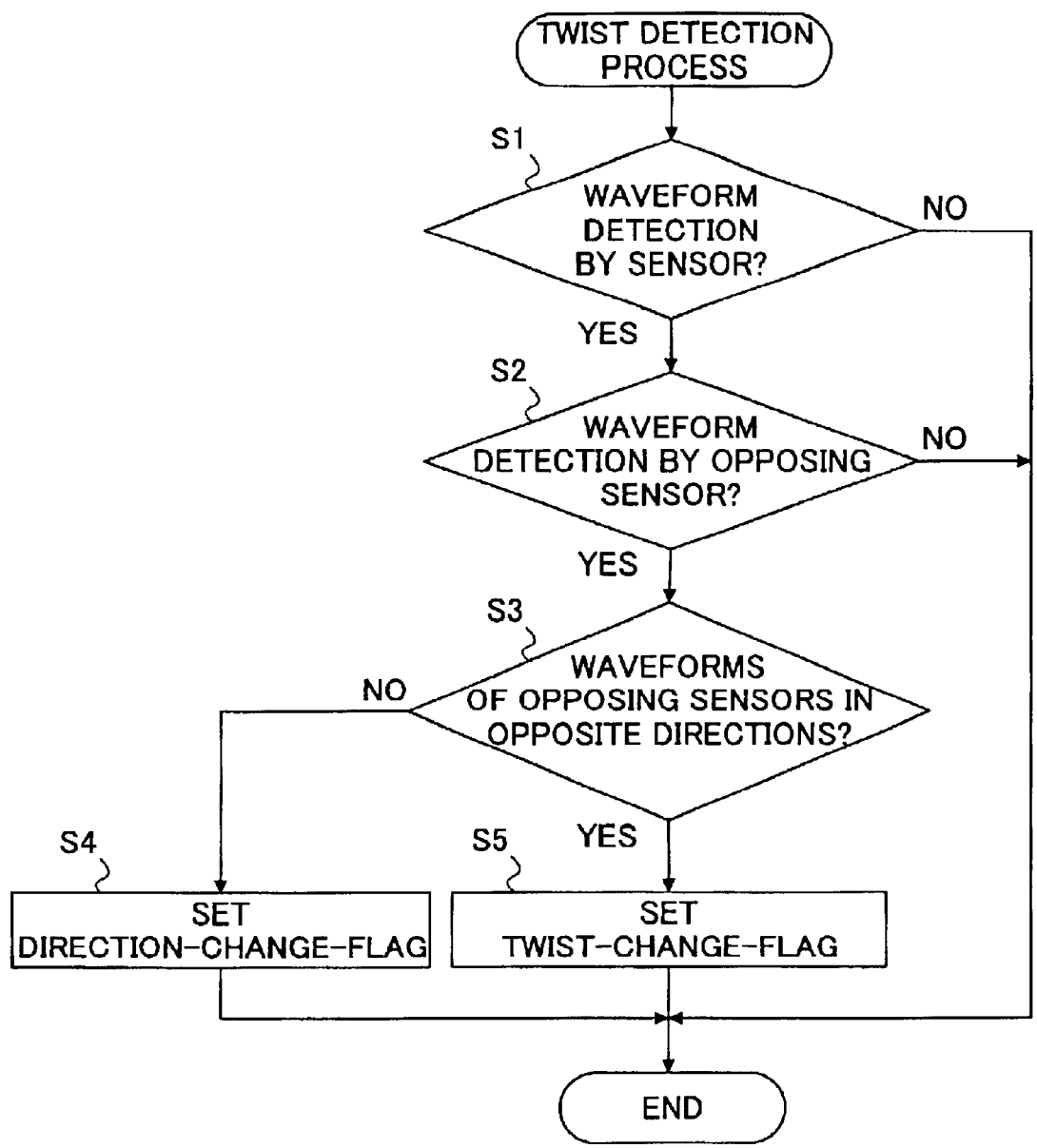
FIG. 15 is a flowchart showing a twist-sensing process of the acceleration-sensing system of the fourth embodiment of the present invention.

FIG. 15 is a flowchart showing a twist-sensing process of the acceleration-sensing system of the fourth embodiment of the present invention.

The central operation unit 104 performs the twist-sensing process. In step S1, it is determined whether detection signals from one of the acceleration-sensing units 411 through 414 are detected. In step S2, it is determined whether detection signals from an opposing acceleration-sensing unit are detected. For example, if detection signals from the acceleration-sensing unit 411 are detected in step S1, it is determined in step 2 whether detection signals from the acceleration-sensing unit 412 are detected. If detection signals from the acceleration-sensing unit 413 are detected in step S1, it is determined in step S2 whether detection signals from the acceleration-sensing unit 414 are detected.

Then, in step S3, it is determined whether the detection signals of the opposing acceleration-sensing units 411 and 412, or of the opposing acceleration-sensing units 413 and 414 have mutually opposite polarities. In other words, it is determined whether the acceleration-sensing system experiences accelerations in the same direction or in opposite directions.

If it is determined in step S3 that the opposing acceleration-sensing units such as the acceleration-sensing units 413 and 414 experience accelerations in the same direction, it can be determined that the acceleration-sensing system is in a state shown in FIG. 14C. Then, in step S4, a direction change flag is set indicating that there is a change of acceleration in a predetermined direction, i.e., in the ×2 direction.

If it is determined in step S3 that the opposing acceleration-sensing units such as the acceleration-sensing units 411 and 412 experience accelerations in opposite directions, it can be determined that the acceleration-sensing system is twisted. Then, in step S5, a twist flag is set indicating that there is a twist in the direction shown by an arrow θ1.

The central operation unit 104 can combine the detection data from the acceleration-sensing units and the above-mentioned flags and send them to a computer so that twist motions can be detected by the computer.

Figure 16A:
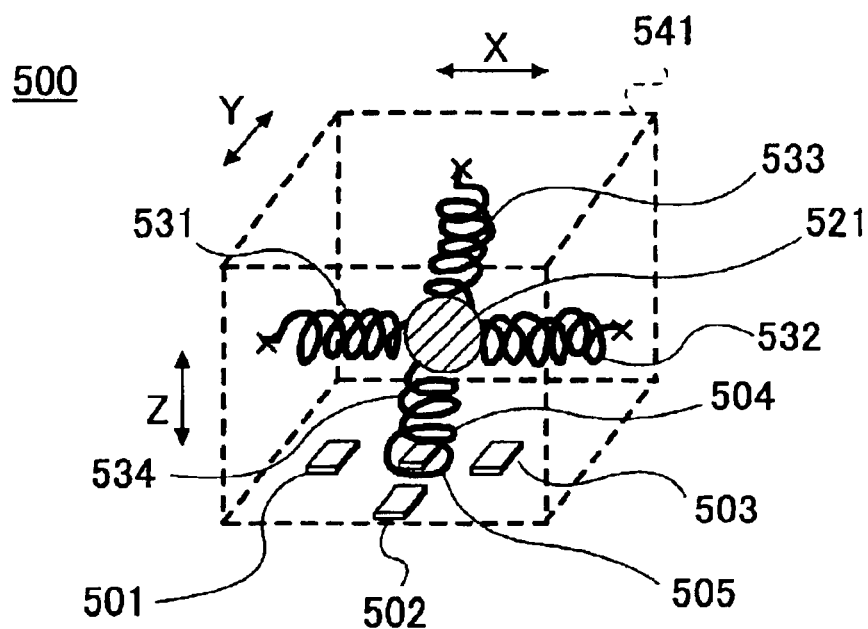
FIGS. 16A and 16B are diagrams showing a three-dimensional acceleration-sensing system of the fifth embodiment of the present invention.
Figure 16B:
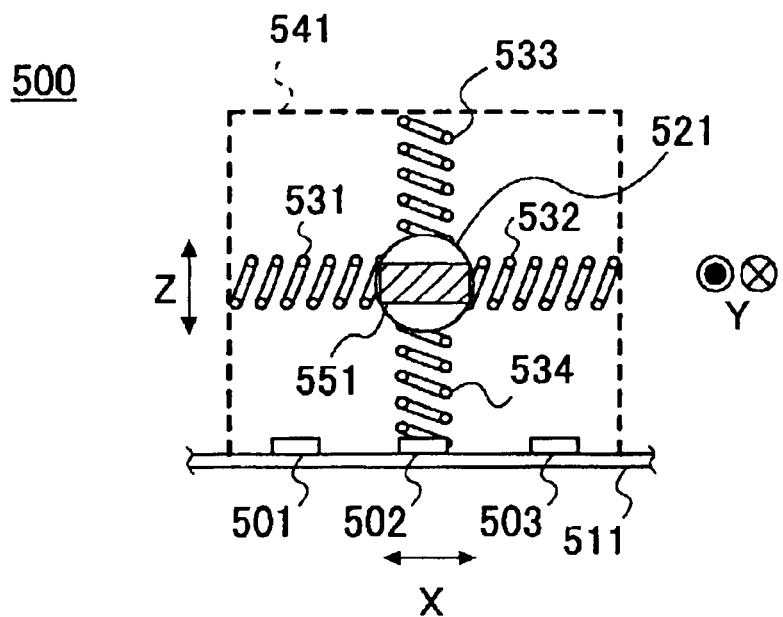

FIGS. 16A and 16B are diagrams showing a three-dimensional acceleration-sensing system of the fifth embodiment of the present invention.

An acceleration-sensing system 500 includes five Hall elements 501 through 505 that are arranged in a cross-shaped configuration and are mounted on a circuit board 511. The acceleration-sensing system 500 further includes a housing 541 provided on the circuit board 511. A weight part 521 is provided inside the housing 541 such that it is movable in a three-dimensional manner by springs 531 through 534. The weight part 521 is held by the springs 531 through 534 at substantially the center of the housing 541. A permanent magnet 551 is provided inside the weight part 521.

When the weight part 521 experiences acceleration in the direction shown by an arrow X, the weight part 521 moves in the direction shown by the arrow X against the biasing forces of the springs 531 through 534. As a result of a movement of the weight part 521 in the direction shown by an arrow X, signals corresponding to the displacement of the weight part 521 from the Hall elements 501 and 503 are output.

When the weight part 521 experiences acceleration in the direction shown by an arrow Y, the weight part 521 moves in the direction shown by the arrow Y against the biasing forces of the springs 531 through 534. As a result of a movement of the weight part 521 in the direction shown by an arrow Y, signals corresponding to the displacement of the weight part 521 from the Hall elements 505 and 504 are output.

When the weight part 521 experiences acceleration in the direction shown by an arrow Z, the weight part 521 moves in the direction shown by the arrow Z against the biasing forces of the springs 531 through 534. As a result of a movement of the weight part 521 in the direction shown by an arrow Z, signals corresponding to the displacement of the weight part 521 from the Hall element 502 are output.

Accordingly, acceleration in the direction shown by an arrow X can be detected from the differential output of the Hall elements 501 and 503. Also, acceleration in the direction shown by an arrow Y can be detected from the differential output of the Hall elements 502 and 504. Further, acceleration in the direction shown by an arrow Z can be detected from the output of the Hall element 505.

According to the present embodiment, acceleration of a low frequency can be detected by elastically supporting the weight part 521 using a plurality of springs 531 through 534 and selecting the elastic force of the springs 531 through 534 as a force corresponding to the frequency of the detected frequency of the acceleration.

In the present embodiment, the acceleration in the direction shown by an arrow Z is detected by the output from a single Hall element 505. However, it is also possible to provide a Hall element on the top surface of the housing 541 so as to derive a differential output with the Hall element 505.

In the first through fifth embodiments, Hall elements are used as electromagnetic conversion elements, but it is also possible to use ferromagnetic thin-film magneto-resistive elements. Further, it is also possible to use a combination of Hall elements and ferromagnetic thin-film magneto-resistive elements. For example, in the fifth embodiment, ferromagnetic thin-film magneto-resistive elements may be used instead of the Hall elements 501 through 504 for sensing accelerations in the directions shown by arrows X and Y and the Hall element 505 for sensing acceleration in the direction shown by an arrow Z may be used as in the fifth embodiment described above.

Further, the present invention is not limited to these embodiments, and variations and modifications may be made without departing from the scope of the present invention.

The present application is based on Japanese priority application No.2001-233215 filed on Aug. 1, 2001, the entire contents of which are hereby incorporated by reference.

What is claimed is:

1. An acceleration-sensing system for sensing acceleration in a three-dimensional manner, said acceleration-sensing system comprising:
   a first acceleration-sensing unit sensing acceleration in a two-dimensional manner along first and second directions that are perpendicular to each other, wherein the first acceleration-sensing unit comprises a first electromagnetic converting element and a first magnetic force-generating part movable along the first and the second directions in accordance with acceleration;
   a second acceleration-sensing unit sensing acceleration in a one-dimensional manner along at least a third direction that is perpendicular to said first and second directions, wherein the second acceleration-sensing unit comprises a second electromagnetic converting element and a second magnetic force-generating part movable along the third direction in response to the acceleration; and
   a circuit board on which said first and second acceleration-sensing units are mounted.

2. The acceleration-sensing system as claimed in claim 1, wherein the first and the second electromagnetic converting elements are mounted on said circuit board.

3. The acceleration-sensing system as claimed in claim 1, wherein said second acceleration-sensing unit has the same structure as said first acceleration-sensing unit and is configured to sense the acceleration in one of said first and second directions.

4. The acceleration-sensing system as claimed in claim 1, wherein said electromagnetic converting element is a Hall element.

5. The acceleration-sensing system as claimed in claim 1, wherein said electromagnetic converting element is a Hall element or a ferromagnetic thin-film magnetic resistance element.

6. The acceleration-sensing system as claimed in claim 1, wherein said first acceleration-sensing unit further comprises a third electromagnetic converting element, said first electromagnetic converting element is provided along one of said first and second directions, and said third electromagnetic converting element is provided along a remaining one of said first and second directions.

7. The acceleration-sensing system as claimed in claim 6, wherein the first, second, and third electromagnetic converting elements are mounted on said circuit board.

8. An acceleration-sensing system comprising:
   a plurality of acceleration-sensing units sensing acceleration in a two-dimensional manner along first and second directions that are perpendicular to each other, said plurality of acceleration-sensing units being combined to sense acceleration in a three-dimensional manner and angular acceleration;
   wherein each of said acceleration-sensing units comprises an electromagnetic converting element and a magnetic force-generating part movable along said first and second directions in response to the acceleration; and
   a single supporting member to which said plurality of acceleration-sensing units are attached.

9. The acceleration-sensing system as claimed in claim 8, wherein said single supporting member has a hemispherical shape.

* * * * *